United States Patent [19]

Carbonneau et al.

[11] Patent Number: 4,546,277

[45] Date of Patent: Oct. 8, 1985

[54] LINEAR MOTOR

[75] Inventors: James T. Carbonneau; Paul Stahel, both of Grand Rapids, Mich.

[73] Assignee: Carbonneau Industries, Inc., Grand Rapids, Mich.

[21] Appl. No.: 626,684

[22] Filed: Jul. 2, 1984

[51] Int. Cl.$^4$ .............................................. H02K 41/02
[52] U.S. Cl. ......................................... 310/13; 310/27
[58] Field of Search ...................................... 310/12–14, 310/27

[56] References Cited

U.S. PATENT DOCUMENTS

| | | | |
|---|---|---|---|
| 3,439,198 | 4/1969 | Lee | 310/13 |
| 3,666,977 | 5/1972 | Helms | 310/13 |
| 3,743,870 | 7/1973 | Hunt | 310/13 |
| 3,751,693 | 8/1973 | Gabor | 310/13 |
| 4,161,666 | 7/1979 | Bacsanyi et al. | 310/27 |

*Primary Examiner*—Donovan F. Duggan
*Attorney, Agent, or Firm*—Varnum, Riddering, Schmidt & Howlett

[57] ABSTRACT

A linear motor (10) for use with a read/write head of computer disk storage or the like includes a rectangular housing (12) having a central bore (14) extending axially therethrough. A cantilevered pole piece (16) extends concentrically through the bore (14). Elongated and radially polarized bar magnets (20) are secured to the housing (12) on the bore surface or to the pole piece (16) and positioned so that radial axes extending diagonally from the center of the bore (14) to each of the housing corners (22) biscet the magnets (20). An armature (25) having a coil wire (30) is concentrically positioned within the central bore (14) between the pole piece (16) and the magnets (20) (or between the magnets (20) and the housing (12)). Forces are exerted on the coil wire (30) in response to application of electric current through the coil wire (30) in the presence of magnetic flux produced by the magnets (20).

9 Claims, 4 Drawing Figures

LINEAR MOTOR

TECHNICAL FIELD

The invention relates to electromagnetic actuated devices, and, more particularly, to relatively small linear electric motors for use in controlling apparatus such as read/write transducer heads on computer disk storage media or the like.

BACKGROUND ART

The general concept that external magnetic fields exert forces on electric currents flowing within such fields historically has been employed in the design of electromagnetic apparatus such as electric motors. The most common type of electric motor is of the rotating type, wherein current-carrying elements and permanent magnets are configured in a manner so that forces produced by electromagnetic effects are exerted on a rotatably supported axial device, commonly referred to as an armature. The vector sum of the generated forces has a time-variant direction so as to apply a torque to the armature and rotate the same.

Another type of electric motor employing the same general electromagnetic concepts is commonly referred to as a linear motor. In contrast to an electric motor of the rotating type, the armature of a linear motor is mounted for linear movement along its axis. Correspondingly, the current-carrying elements and permanent magnets are configured so as to exert forces in the appropriate direction to produce linear armature movement. It should be noted that the term "armature" is being used herein in its broadcast sense to refer to the moving component of an electric motor, and should not be construed as referring only to rotating components.

In known linear motors, the configuration of the electromagnetic elements is usually relatively simple compared to the more complex configuration of elements typically found in rotating-type motors. For example, the general structure of several well-known linear motors includes a stationary frame or housing having an inner spacial area with permanent magnets positioned within the spacial area. The armature, often referred to as an "actuator" in linear motor terminology, can include a coiled wire or similar current-carrying element received within the spacial area and positioned between the magnets and a low reluctance element centrally located in the spacial area. The centrally located element is commonly referred to as a "pole piece". As electric current is applied through the coiled wire in the presence of the magnetic flux resulting from the permanent magnets, forces are exerted on the coiled wire of the armature. The magnets and current-carrying coiled wire are configured so that the forces are applied in a constant direction to move the armature axially relative to the pole piece.

An example of a linear motor as described above is disclosed in the U.S. Pat. No. 3,743,870 to Hunt, issued July 3, 1973. The Hunt patent describes a linear motor comprising a rectangular housing forming a pole piece, a rectangular core rigidly mounted within a spacial area within the housing to form another pole piece, and rectangular slab-like magnets mounted to the housing so as to form air gaps between the magnets and the core. A rectangular coil is supported by axially projecting stems extending out of the front of the housing. The coil axially slides within the air gaps between the magnets and the coil, with forces applied to the coil by means of application of electric current.

Linear motors have historically been utilized in applications requiring positioning control, i.e. applications where servo systems are employed. Such motors have found a particularly significant application in the emerging computer industry. Specifically, one type of data storage device now commonly employed in both large scale and small scale computer systems is the disk. Although various types of disk storage devices are now employed, a conventional type of disk consists of a flat and circular rotating surface coated with a magnetic material, such as iron oxide. Surface positions of the disk are characterized as data storage cells and alignment of the magnetic material in each cell in either of two predetermined magnetic configurations provides a binary information digit. The cells are usually arranged in concentric "tracks" on the disk, and the electromechanical assembly for rotating the disk is commonly referred to as a disk drive.

Data is typically stored on and retrieved from disks by means of movable electromagnetic transducers known as read/write "heads". The magnetic configurations of the disk data cells are imprinted or modified when the head is in a "write" mode. Sensing of the magnetic configurations is accomplished when the head is in a "read" mode. The disks are typically rotated extremely rapidly, and data can be quickly imprinted on or sensed from any cell on the disk by moving the head in a radial direction across the magnetized disk surface. Linear electric motors are commonly employed to actuate and control movement of the read/write disk heads.

Several inherent problems must be overcome when employing linear electric motors to achieve read/write functions of computer data storage devices. For example, the static performance criteria for such read/write heads includes the requirement that the heads must be held stationary over the disk surface in an extremely rigid and accurate manner in view of the extremely small size of the storage data cells.

In addition, relatively stringent dynamic performance criteria must also be met. Again, with the extremely small size of the storage data cells, substantial accuracy must be achieved in properly positioning the read/write head at a particular location adjacent the disk surface. Furthermore, a computer system cannot be substantially limited in its instruction execution time by data access time requirements. Accordingly, movement of the head across the disk surface must be rapid.

The aforedisclosed problems of stringent static and dynamic performance criteria for linear motors can be associated with several types of motor applications. However, other problems are more specifically associated with the use of such linear motors to achieve movement of read/write transducer heads for computer disks. For example, any type of electromagnetic motor generates magnetic fields in various spacial configurations. The generated magnetic fields external from the flux resulting in forces applied to the armature are commonly referred to as "stray" magnetic fields or flux. In many applications involving linear motors, the stray magnetic flux results in no apparent degradation or harm relating to the use of the motor. However, when a linear motor is utilized to control movement of a read/write head across a disk surface, the stray flux can be a substantial problem in view of the magnetic characteristics of the disks themselves. It is apparent that stray magnetic fields can readily result in erroneous magnetizations of the disk data cells. In order to overcome this problem, the motors have been shielded and spaced from the disk through mechanical linkages.

Various other types of problems are also commonly associated with various types of linear motor applications. For example, with the use of such motors in applications associated with computer disk apparatus, the configuration of the structural and magnetic elements of the linear motor should allow for the motor to be relatively small, while still providing sufficient forces and rapid response to armature current. In addition, if power consumption associated with energizing the current-carrying elements of the motor and applying forces to the armature can be maintained at a minimum, external circuit components associated with application of power to the motor can correspondingly be reduced in size.

One primary consideration with respect to the use of linear motors in substantially all types of applications relates to the physically realizable linear characteristics of the motor. That is, an ideal linear electric motor will generate forces directly proportional to the magnitude of electric current flowing in the armature coil in the presence of constant state external magnetic fields. However, it is known that linear motors employing elongated permanent magnets having a linear polarization will often exhibit some nonlinearity of generated forces. That is, even with a current of constant magnitude applied through the armature coil, the force applied to the armature at one position along its stroke may have a magnitude substantally different from forces generated at other armature stroke positions. Accordingly, the motor tends to exhibit "hot" and "cold" positions at which the generated forces tend to differ. When there is a differential in generated forces along the stroke length of the armature, the coil current required to initiate movement of the armature and to move the armature at a particular velocity or rate of acceleration can be dependent upon the relative position of the armature along its stroke. In such event, accurately controlling armature movement can be substantially difficult.

In addition, if the magnitude of generated forces necessary to move the armature are dependent upon the position of the armature along its stroke, power can be wasted. For example, if a particular location along the armature stroke length is a "cold" spot, the magnitude of current necessary to move the armature away from this stroke position may be substantially greater than the requisite current to move the armature away from other stroke positions. However, it is necessary for the engineer to design the armature current requirements on the basis of locations along the stroke length at which maximum current is required. These armature current requirements result in wasted power.

Various types of magnetic and structural configurations have been developed in attempts to overcome one or more of the previously described problems associated with linear motors and their applications. For example, permanent magnets having a radial polarization, instead of conventional linear polarization, have been utilized in linear motors to reduce stray magnetic flux. The previously referenced Hunt Patent discloses a linear motor employing radially polarized magnets.

As another example, the U.S. Pat. No. 3,723,780, to Gillum, issued Mar. 27, 1973, discloses a linear motor having a tubular and radially polarized magnet with an iron ring positioned in the internal spacial area of the magnet. A coil is disposed in the air gap between the ring and magnet. The Gillum motor also includes washer slugs and a central iron bar in contact with the ring so as to form a closed-loop low reluctance path of magnetic flux.

In another example, the U.S. Pat. No. 3,723,779, to Gillum, issued Mar. 27, 1973, describes a linear motor having a compensation winding mounted to the exterior of a center core. The purpose of the compensation winding is to overcome the effects of the magnetic field generated by the electric current in the armature coil. The magnetic flux resulting from the armature coil current tends to distort the magnetic forces exerted by the permanent magnets. Compensation winding arrangements can be particularly necessary when relatively large pole pieces are employed in the motor. In such event, the magnetic fields resulting from the armature coil current tend to be relatively large.

Another patent showing employment of radially polarized tubular magnets within a tubular housing is the U.S. Pat. No. 3,681,630, to Sutton issued Aug. 1, 1972. Radially polarized magnets having another structural configuration are shown in the U.S. Pat. No. 4,217,507, to Jaffe et al. issued Aug. 12, 1980. Jaffe et al disclose a linear motor for a sewing machine having a tubular housing and a spool of plastic material in which is embedded a series of permanent bar magnets made of semarium cobalt. A coil is wound around the spool and an armature driven by coil current reciprocally slides within the central opening of the spool.

SUMMARY OF THE INVENTION

In accordance with the invention, a linear motor is adapted for use to accurately control linear movement of a computer disk read/write transducer or the like where stray magnetic flux must be kept to a relative minimum. The motor includes an elongated housing having an outer surface and constructed of a relatively low reluctance magnetic material. A central bore extends axially through the housing so as to form an inner housing surface. An elongated pole piece, also constructed of a relatively low reluctance material, is mounted in the bore so as to form an annular or otherwise continuous spacial area between the pole piece and the inner housing surface.

The elongated housing is uniform in cross-section along its length and the outer surface and central bore are formed to provide alternating areas of thicker and thinner radial wall dimensions.

A plurality of radially polarized and elongated bar magnets are mounted in the bore to the inner housing surface or the pole piece, so as to extend longitudinally at least partially through the bore. The radially polarized magnets are positioned at the areas of thicker radial wall dimensions and between the areas of thinner wall dimensions. A movable armature coil constructed of conductive material is concentrically disposed around the pole piece in the spacial area. Means are provided to apply electric current of a desired magnitude and polarity to the armature coil in the presence of the magnetic fields of the radially polarized magnets. Accordingly, forces are exerted on the coil to move the coil in an axial direction, with the forces having a direction dependent on current polarity and a magnitude proportional to the current magnitude.

The housing can have a rectangular cross-sectional configuration. The magnets can include four radially polarized magnets located so that the magnets are bisected by lines radially extending from the central axis of the bore through corners of the housing.

In one embodiment of the invention, the magnets can be mounted to the inner housing surface so that air gaps are formed between the magnets and the pole piece. The armature coil is disposed within the air gaps.

In another embodiment of the invention, the radially polarized magnets are mounted to the pole piece. Air gaps are thereby formed between the inner housing surface and the radially polarized magnets. The armature coil is positioned within these air gaps.

The radially polarized bar magnets can be constructed of a rare earth cobalt material. The rare earth cobalt material can comprise permanently magnetizable semarium cobalt. In addition, the radially polarized bar magnets can be rectangular in cross-section. Furthermore, the cross-section of the radially polarized magnets can have a square configuration.

BRIEF DESCRIPTION OF THE DRAWINGS

The invention will now be described with reference to the drawings in which.

DETAILED DESCRIPTION

Figure 1:
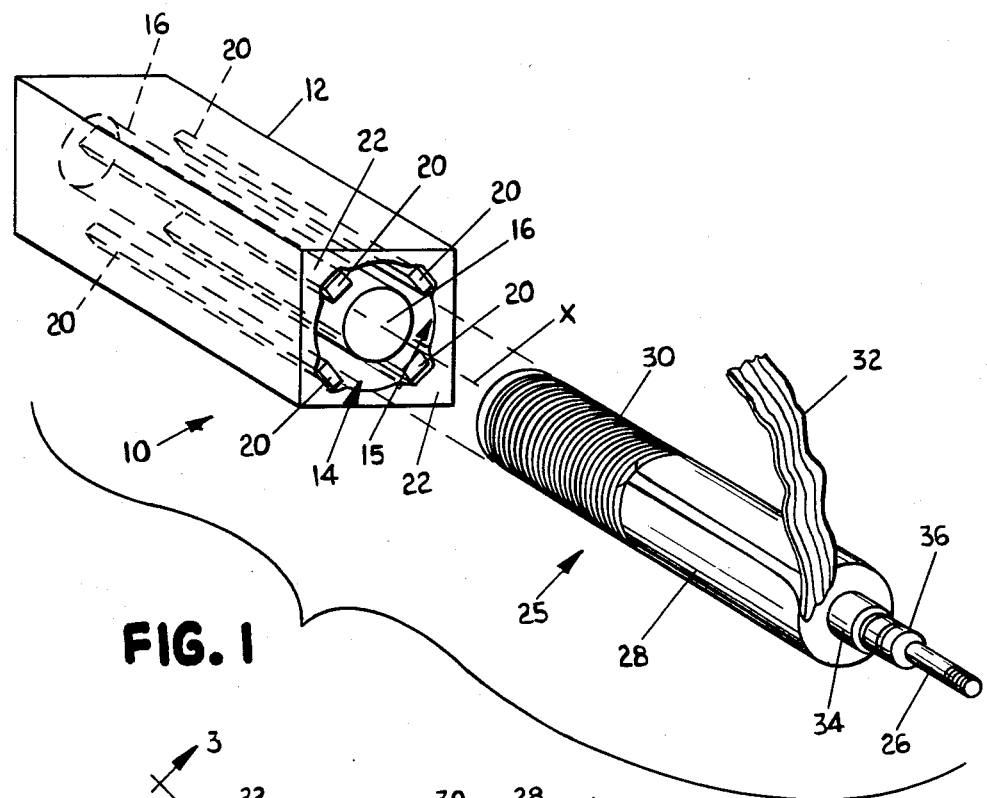
FIG. 1 is a perspective and partially exploded view of a linear motor in accordance with the invention.

The principles of the invention are disclosed, by way of example, in a linear motor 10 as depicted in FIG. 1. The linear motor 10 can be adapted for use in various applications, but is particularly suited for use in controlling the position of an electromagnetic transducer for storing and retrieving data from a magnetized computer disk. Although not shown in the drawings, the transducer (commonly referred to as a read/write head) is mounted in a manner so as to be adjacent to a disk surface having "cells" positioned in circular tracks, with each cell being in one of two alternative magnetized states. Accordingly, the disk provides a storage medium for data in which the data can be stored in binary format. As described in the section entitled "Background Art", linear motors employed to control read/write heads for computer storage disks must have substantial accuracy and minimum tolerances with respect to its static and dynamic performance characteristics. In addition, linear motors employed for this purpose must also exhibit relatively low stray magnetic flux, since the eletromagnetic environment includes the magnetized disk.

Figure 2:
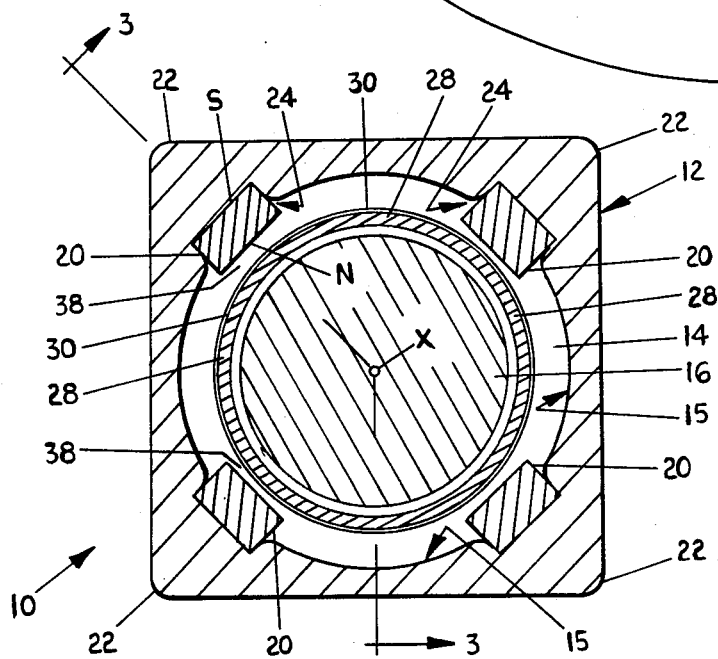
FIG. 2 is a sectional end view of the linear motor taken along lines 2—2 of FIG. 1.
Figure 3:
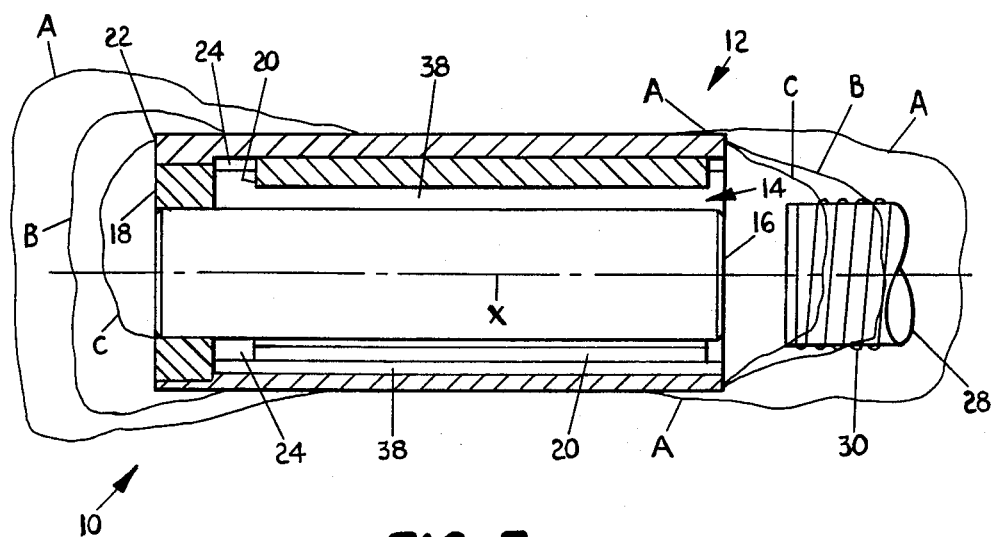
FIG. 3 is a sectional side view of the linear motor taken along lines 3—3 of FIG. 2 and showing lines of stray flux when the armature is removed from the motor.

Referring to FIGS. 1-3, the linear motor 10 includes a housing 12 having a rectangular cross-sectional configuration. The housing 12 is preferably constructed of a relatively soft iron or comparable low reluctance material. The housing 12 is substantially elongated and includes a central bore 14 extending axially through the housing 12, thus forming an inner housing surface 15. The bore 14 is preferably concentric with respect to housing 12. For purposes of description, FIGS. 1-3 depict a longitudinal central axis X extending through housing 12.

As shown in FIG. 3, the rear portion of the housing 12 includes a cylindrical portion having a relatively larger diameter than the diameter of bore 14. An end ring 18 is mounted within the relatively larger cylindrical portion and secured to the rectangular housing 12 in any suitable manner. A pole piece 16 having a cylindrical cross-section is mounted in a cantilevered manner at one end in the end ring 18 and extends forward from end ring 18 within the axial bore 14. The pole piece 16 is positioned concentrically within the bore 14 so that the central axis of both the axial bore 14 and the pole piece 16 is the X axis. As shown in FIG. 3, the pole piece 16 extends through the axial bore 14 from end ring 18 and terminates at a location substantially corresponding to the other end surface of rectangular housing 12. The pole piece 16 is preferably constructed of a soft iron or other relatively low reluctance material which provides a means for concentrating the lines of flux emanating from the permanent magnets subsequently described herein. The pole piece 16 in a linear motor is functionally comparable to pole pieces typically used in electromagnetic speakers and the like.

As best shown in FIG. 2, the axial bore 14 extending through the rectangular housing 12 is not perfectly cylindrical, but instead includes four indentations 24 located on axes extending between diametrically opposed corners 22 of the rectangular housing 12. Each indentation 24 extends longitudinally along the inner housing surface 15 and is positioned at a location 90° apart from adjacent indentations 24 relative to the central axis X.

Mounted within each of the indentations 24 is a permanent magnet 20 having an elongated bar-shaped configuration. In accordance with the invention, and as shown in FIG. 2, each of the permanent magnets 20 is radially polarized. That is, instead of the conventional linear polarization of a bar magnet, the lateral elongated surface on one side of each bar magnet will have an opposite polarity to that of an opposing side of the bar magnet. This radial polarization is distinguishable from the typical linear polarization wherein ends of the magnet are oppositely polarized.

The radially polarized bar magnets 20 are each mounted in separate ones of the indentations 24 in a manner so that like poles are adjacent the pole piece 16 and, correspondingly, like poles are adjacent the surface of axial bore 14. In the exemplary embodiment shown in FIG. 2, the "north" or "N" poles are adjacent to pole piece 16, while the "south" or "S" poles are adjacent the surface of bore 14. The radially polarized magnets 20 are constructed of a rare earth cobalt, preferably semarium cobalt, a relatively recently developed permanently magnetizable material having magnetic properties particularly suited to apparatus in which strong electromagnetic fields must be developed while simultaneously maintaining relatively low stray magnetic flux. As best shown in FIG. 2, the bar magnets 20 have a rectangular cross-section, which may preferably be of a square configuration.

As shown in FIGS. 1 and 3, the linear motor 10 also includes an armature 25 having an electrically conductive coil wire 30 wound around the outer surface of a hollow coil form 28. In the particular embodiment of the invention shown in FIGS. 1-3, the ends of the coil wire 30 are connected to lead wires in braid 32 which, in turn, are connected to an external source (not shown) of electric power to selectively supply electrical current to the coil wire 30.

As shown in FIG. 1, mounted to the forward end surface of the coil form 28 is an actuator shaft 26 adapted to be connected to the apparatus to be controlled, such as a read/write disk head (not shown). For purposes of insulating such connection, a bushing 34 and rubber washers 36 can be suitably mounted to the actuator shaft 26 adjacent the coil form 28.

The hollow coil form 28 and coil wire 30 are of a suitable diameter so that each can be axially received in the central bore 14 around the pole piece 16. Various conventional arrangements can be employed to support the coil form 28 and coil wire 30 within the axial bore 14 so that the coil wire 30 remains concentric with the pole piece 16.

In operation, and as previously described, the coil form 28 and coil wire 30 are positioned so that the coil wire 30 is within the axial bore 14 and received on the pole piece 16. As depicted in FIG. 2, with the coil wire 30 supported concentrically around the pole piece 16, air gaps 38 are located between pole piece 16 and each of the radially polarized magnets 20, with the coil wire 30 being positioned within air gaps 38. Accordingly, with an electric current applied through lead wires in braid 32 to the coil wire 30, electric current is made to flow within the magnet fields generated by the permanent magnets 20. In accordance with conventional electromagnetic theory, forces are therefore applied to the coil wire 30. With the radial polarization of magnets 20, and the relative structural configuration of the coil wire 30 and the magnets 20, the forces exerted on the coil wire 30 will tend to move the wire and associated coil form 28 in an axial direction concentric with the axis X. The magnitude of the forces applied to coil wire 30 will be substantially linearly proportional to the magnitude of current flowing therethrough. In addition, the vector direction of the forces applied to coil wire 30 will be directly dependent on the polarity of the current flowing through wire 30. Of course, also in accordance with conventional electromagnetic theory, the proportionality factor between the magnitude of current and the applied forces will be dependent upon several factors which substantially remain constant for any given linear motor, such as the number of turns of coil wire 30, strength of the magnetic fields, etc.

With the radial polarization of magnets 20 and with the structural configuration of linear motor 10 as shown in FIGS. 1-3, the stray magnetic flux exhibited by linear motor 12 is relatively small. For example, in accordance with experimentation of linear motors similar to the previously described motor 10, the stray magnetic flux density having a magnitude in the range of one Gauss is shown by the lines A as depicted on FIG. 3. Stray flux density having a magnitude in the range of five Gauss is shown by lines B, where one of lines B is approximately one inch in front of the front center portion of housing 12. Flux lines showing flux density having a magnitude in the range of 10 Gauss are depicted as lines C. In accordance with experimentation where the length of housing 12 was in the range of 2.25 inches, the stray magnetic field appeared to reduce to stray flux associated with the earth's magnetics at a position slightly greater than approximately one inch from the front portion of the rectangular housing 12. This experimentation was performed with the coil wire 30 and associated coil form 28 removed from the housing 12.

With the radial polarization of each of the magnets 20 and the positioning of the magnets 20 adjacent the corners 22 of housing 12, the linear motor 10 exhibits a relatively true linearity. That is, with a constant current applied through the coil wire 30, the force applied to the armature 25 at a position aligned with the central axis X within axial bore 14 will be substantially equal to the applied force at any other position along the axis X. Unlike many other conventional linear motors, the motor 10 does not exhibit "hot" and "cold" positions, whereat the generated forces are relatively large or small for a given current. In accordance with the true linearity exhibited by the motor 10, controlling the cessation of and initiation of movement of armature 25 is very exact, regardless of the stroke position of coil 30.

With true linearity throughout the stroke length, the power requirements to actuate the motor 10 can be maintained at a relative minimum. That is, with the generated forces being substantially constant along the stroke length, it is unnecessary to design the armature current requirements for coil wire 30 on the basis of a point along the stroke at which a maximum current is required.

Figure 4:
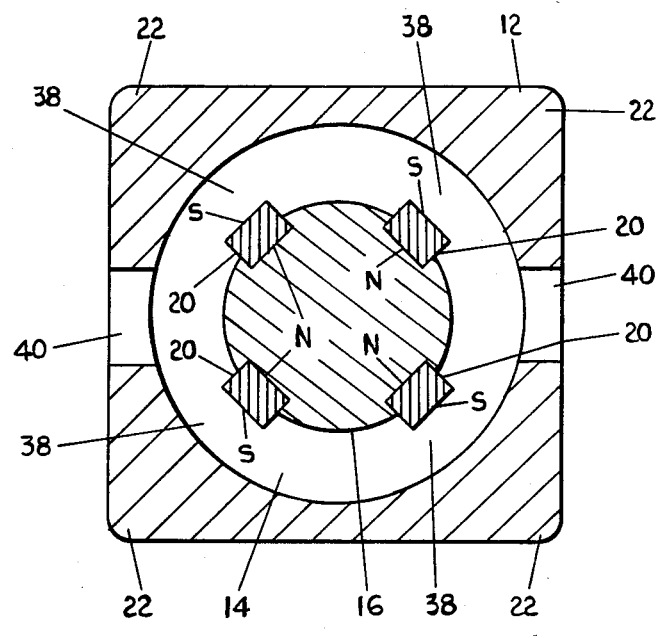
FIG. 4 is a sectional end view of an alternative embodiment of a linear motor in accordance with the invention.

Embodiments alternative to the specific structure of linear motor 10 can also be employed without departing from the novel concepts of the invention. For example, as shown in cross-section in FIG. 4, the radially polarized magnets 20 can be mounted in any suitable manner within indentations formed in the outer lateral surface of pole piece 16. The axial bore 14 can then be perfectly cylindrical, without the requirement of the indentations 24 as depicted in FIG. 2. Similar to the embodiment shown in FIGS. 1-3, the radially polarized magnets 20 are aligned 90° apart from adjacent magnets 20 relative to a central axis X, with each magnet 20 bisected by a line extending between diametrically opposed corners 22 of the rectangular housing 12. The air gaps 38 are then formed between the radially polarized magnets 20 and the low reluctance material of rectangular housing 12 at the corners 22. By positioning the radially polarized magnets 20 along an axis extending between diametrically opposed corners 22 of the housing 12 in both the embodiments shown in FIGS. 1-3 and FIG. 4, the relatively greater thickness of the low reluctance material of rectangular housing 12 at corners 22 will provide a stronger magnetic field, resulting in a substantially greater force applied to coil wire 30 for a given magnitude of current flowing therethrough. In addition, the configuration of the magnets 20 relative to the corners 22 of housing 12 results in stray magnetic fields of relatively small magnitude.

Although not specifically depicted in the drawings, various types of structures can be employed to support the coil wire 30 within the axial bore 14. In addition, the device to be controlled need not be connected to coil form 28 through a direct and axial connection, such as the actuator shaft 26. For example, one means of providing an interconnection arrangement between an actuator shaft and the coil wire 30 or coil form 28 can include the utilization of a pair of housings and coil wires mounted so that the housings are maintained substantially parallel. Slots, such as the slots 40 depicted in the alternative embodiment shown in FIG. 4, can be formed in a lateral side of each of the housings, and shafts can be extended through the slots 40 and connected to the coil wires 30 or coil forms 28. The transverse shafts can then be connected to a central actuator shaft mounted so as to be aligned parallel to the direction of movement of the coil wires 30. With this arrangement, application of current through the coil wires 30 and the resultant forces applied thereto will cause the actuator shaft interconnected to two of the coil wires to move in a direction parallel to movement of the coil wires. Such an arrangement of multiple linear motors increases the total forces applied to the actuator shaft for given magnitudes of electric current.

As apparent to those skilled in the fields of motor design and electromagnetic theory, other embodiments of a linear motor in accordance with the invention can be designed. The principles of a linear motor in accordance with the invention are not limited to the specific motors described herein. It will be apparent to those skilled in the art that modifications and other variations of the above-described illustrative embodiments of the invention may be effected without departing from the spirit and scope of the novel concepts of the invention.

The embodiments of the invention in which an exclusive property or privilege is claimed are defined as follows:

1. A linear motor adapted for use to accurately control linear movement of a computer disk read/write transducer or the like where stray magnetic flux must be relatively minimal, the motor comprising:
    an elongated housing uniform in cross-section along its length and constructed of a relatively low reluctance magnetic material, said housing having an outer surface and a central bore extending axially through the housing so as to form an inner housing surface, the outer surface and central bore being formed to provide alternating areas of thicker and thinner radial wall dimensions;
    an elongated pole piece constructed of a relatively low reluctance magnetic material and mounted in the bore so as to form a continuous spacial area between the pole piece and the inner housing surface;
    a plurality of radially polarized and elongated bar magnets mounted in the bore to the inner housing surface or the pole piece so as to extend longitudinally at least partially therethrough, the radially polarized magnets being positioned at the areas of thicker radial wall dimensions and between the areas of thinner radial wall dimensions;
    a movable armature coil of conductive material concentrically disposed around the pole piece in the spacial area; and
    means for applying electric current of a desired magnitude and polarity to the armature coil in the presence of the magnetic fields of the radially polarized magnets so as to exert forces on the coil to move the coil in an axial direction, the forces having a direction dependent on current polarity and a magnitude proportional to the current magnitude.

2. A linear motor in accordance with claim 1 wherein the housing has a rectangular cross-sectional configuration.

3. A linear motor in accordance with claim 2 wherein the radially polarized magnets comprise at least four bar magnets positioned so that axes extending radially from the central bore axis through each corner of the housing bisect the radially polarized magnets.

4. A linear motor in accordance with claim 3 wherein the magnets are mounted to the inner housing surface so as to form air gaps between the radially polarized magnets and the pole piece, and the armature coil is disposed within the air gaps.

5. A linear motor in accordance with claim 3 wherein the radially polarized magnets are mounted to the pole piece so as to form air gaps between the housing and the radially polarized magnets, and the armature coil is disposed within the air gaps.

6. A linear motor in accordance with claim 1 wherein the radially polarized bar magnets are constructed at least in part of a rare earth cobalt material.

7. A linear motor in accordance with claim 1 wherein the radially polarized magnets are constructed at least in part of a permanently magnetizable samarium cobalt material.

8. A linear motor in accordance with claim 1 wherein each of the radially polarized bar magnets are rectangular in cross-section.

9. A linear motor in accordance with claim 1 wherein each of the radially polarized bar magnets are square in cross-section.

* * * * *